United States Patent
Yoo (10) Patent No.: US 11,348,215 B2
(45) Date of Patent: May 31, 2022

(54) METHOD AND APPARATUS FOR RECONSTRUCTING 4D IMAGE BASED ON INTEGRAL IMAGING

(71) Applicant: SANGMYUNG UNIVERSITY INDUSTRY-ACADEMY COOPERATION FOUNDATION, Seoul (KR)

(72) Inventor: Hoon Yoo, Suwon-si (KR)

(73) Assignee: SANGMYUNG UNIVERSITY INDUSTRY-ACADEMY COOPERATION FOUNDATION, Seoul (KR)

(*) Notice: Subject to any disclaimer, the term of this patent is extended or adjusted under 35 U.S.C. 154(b) by 0 days.

(21) Appl. No.: 17/029,691

(22) Filed: Sep. 23, 2020

(65) Prior Publication Data
US 2021/0090227 A1 Mar. 25, 2021

(30) Foreign Application Priority Data
Sep. 24, 2019 (KR) .................. 10-2019-0117446

(51) Int. Cl.
*G06T 5/50* (2006.01)
*G06T 5/00* (2006.01)
*G06T 3/20* (2006.01)
*G06T 3/40* (2006.01)

(52) U.S. Cl.
CPC ............... *G06T 5/50* (2013.01); *G06T 3/20* (2013.01); *G06T 3/40* (2013.01); *G06T 5/002* (2013.01)

(58) Field of Classification Search
CPC .. G06T 5/50; G06T 5/002; G06T 3/20; G06T 3/40; G06T 7/557; G06T 2207/10052; G06T 5/001; G06T 7/50; G06T 2210/22
See application file for complete search history.

(56) References Cited

U.S. PATENT DOCUMENTS

| | | | | |
|---|---|---|---|---|
| 8,189,089 | B1* | 5/2012 | Georgiev | H04N 5/232945 348/343 |
| 9,197,877 | B2* | 11/2015 | Javidi | H04N 13/204 |
| 9,232,211 | B2* | 1/2016 | Javidi | G06K 9/6247 |
| 9,344,700 | B2* | 5/2016 | Zalevsky | G02B 27/46 |
| 2020/0380710 | A1* | 12/2020 | Javidi | G06T 7/521 |

FOREIGN PATENT DOCUMENTS

KR  10-2009-0025420 A  3/2009
KR  10-1614121 B1  4/2016

OTHER PUBLICATIONS

Lee, English translation of 10-1614121 cited by applicant.. (Year: 2014).*

* cited by examiner

*Primary Examiner* — Phuoc Tran
(74) *Attorney, Agent, or Firm* — Sughrue Mion, PLLC (57) ABSTRACT

Provided is a method of reconstructing an integral image based on computational integral imaging reconstruction (CIIR), the method including determining a crop ratio of an original elemental image array (EIA), cropping each elemental image in the original EIA according to the determined crop ratio to generate a cropped and translated EIA, magnifying each elemental image in the cropped and translated EIA according to an adjustable magnification factor (k), overlapping the magnified elemental images with an overlapping number that is adjusted according to the adjustable magnification factor (k), and normalizing the overlapping elemental images to generate a reconstructed image.

16 Claims, 8 Drawing Sheets

METHOD AND APPARATUS FOR RECONSTRUCTING 4D IMAGE BASED ON INTEGRAL IMAGING

CROSS-REFERENCE TO RELATED APPLICATION

This application claims priority to and the benefit of Korean Patent Applications No. 2019-0117446, filed on Sep. 24, 2019, the disclosures of which are incorporated herein by reference in its entirety.

BACKGROUND

1. Field of the Invention

The present invention relates to integral imaging reconstruction, and more specifically, to computational integral imaging reconstruction (CIIR).

2. Discussion of Related Art

Integral imaging is a technique for imaging and visualizing three-dimensional (3D) images and, when compared with stereoscopy and holography, provides white light, full parallax, and continuous viewpoints without using additional optical devices, such as glasses, and short-wavelength lasers. Therefore, integral imaging is gaining a great deal of attention in various applications, for example, 3D object visualization, 3D object recognition, driverless vehicle systems, and 3D entertainment.

Figure 1A:
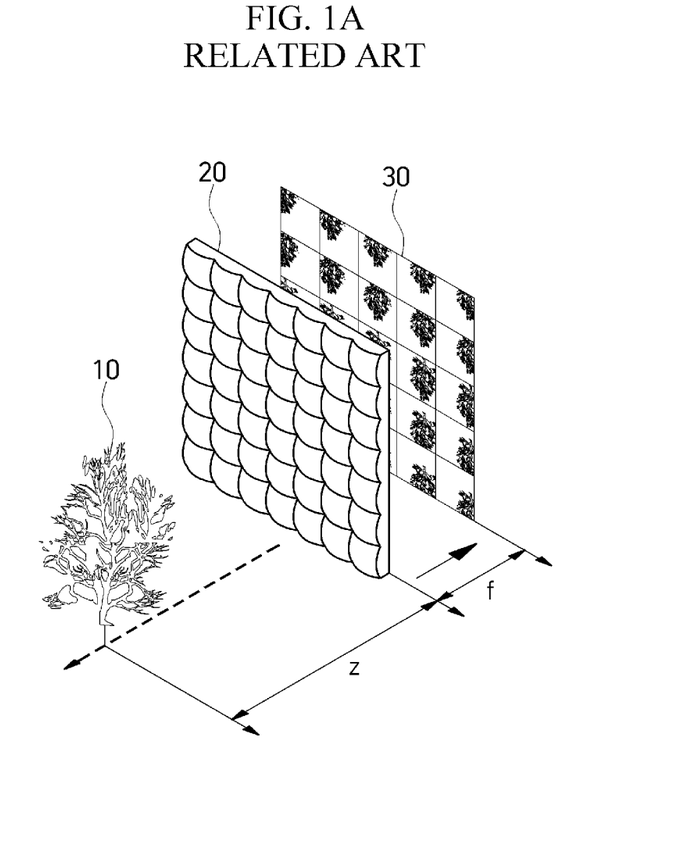
FIGS. 1A and 1B are views for describing a pickup process and a reconstruction process performed by a general integral imaging system.
Figure 1B:
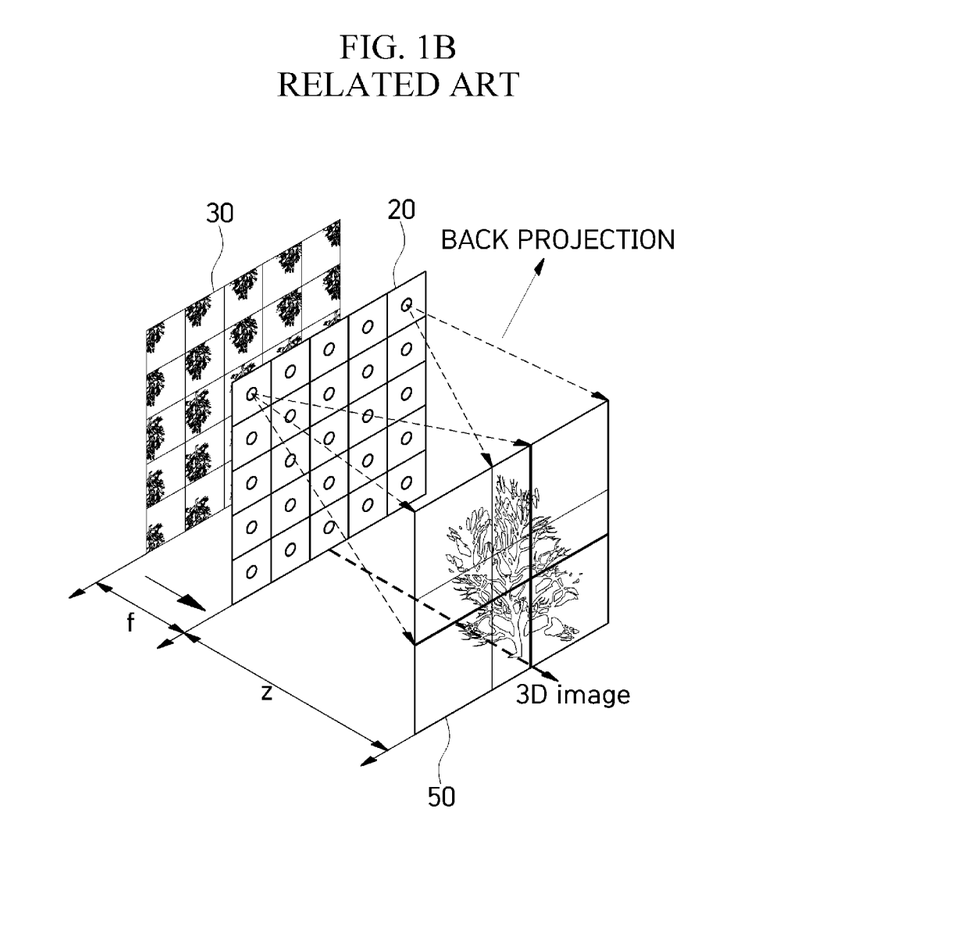

FIGS. 1A and 1B are views for describing a pickup process and a reconstruction process performed by the existing integral imaging system.

the integral image system performs the pickup process and the reconstruction process.

First, in a pickup operation of FIG. 1A, a light ray coming from a 3D object 10 is picked up by a lenslet array 20 and captured by a pickup device. Although the pickup device is not shown in FIG. 1A, the pickup device may be a charge coupled device (CCD) camera. As another type of the pickup method, a camera array may be used instead of a lenslet array. Images of different perspectives obtained from the pickup device have a two-dimensional array structure, which is referred to as an elemental image array (EIA).

In a reconstruction operation of FIG. 1B, a 3D image is optically or digitally reconstructed. The reconstruction method includes optical integral imaging (OII) and computational integral imaging (CII).

In the OII method, an EIA is displayed on an optical display panel, and then a 3D object is observed through a lenslet array.

Conversely, in the CII, a 3D image is digitally reconstructed based on an EIA and a virtual pinhole array 40. The reconstruction technique is referred to as computational integral imaging reconstruction (CIIR).

Unlike OII, a CIIR technique generates a view image regardless of physical limitations of optical devices. Since computationally reconstructed images may be used in various applications such as object recognition and depth estimation, the CIIR technique is highly practical.

The most common CIIR technique is back-projection. Back-projection is a method in which elemental images are magnified while passing through the virtual pinhole array 40 and then overlap each other in a reconstruction image plane 50, as shown in FIGS. 1A and 1B.

Recently, CIIR studies for image quality improvement have been actively discussed. In a first example, a pixel mapping method is configured by ray-tracing the location reached by each pixel of elemental images through pinhole 40 and mapping the location on the reconstruction image plane 50. The method has reduced the amount of computation and improved the image quality. In a second example, a window method analyzes and defines a signal model of a back-projection method, whereby lens effect and artifacts are removed and the quality of reconstructed images is improved. The last example is a method of applying convolution characteristics to elemental images based on the relationship between a periodic function and elemental images. The method adjusts the depth resolution and improves the resolution of the reconstructed image.

Figure 2:
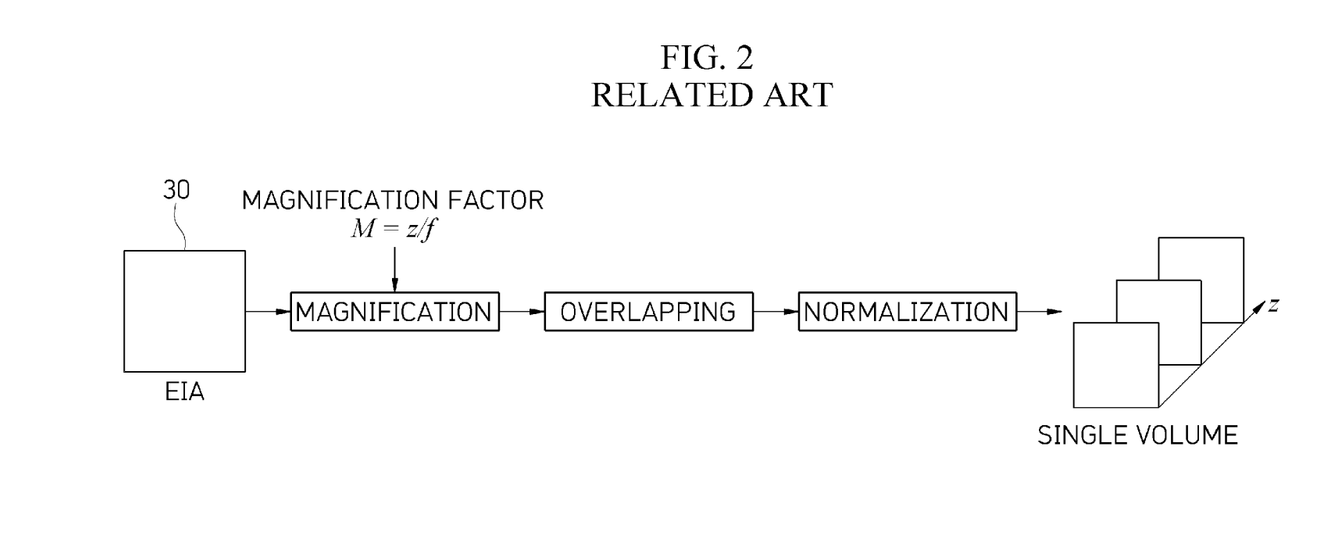
FIG. 2 is a block diagram illustrating components for performing computational integral imaging reconstruction (CIIR) by an existing integral imaging system.

FIG. 2 is a block diagram illustrating components for performing CIIR in the existing integral imaging system.

Referring to FIG. 2, in a CIIR-based reconstruction operation performed by the existing integral image system, elemental images are back-projected through virtual pinholes onto a reconstruction image plane.

When an elemental image has a size of d, a magnified elemental image has a size of M×d.

As shown in FIG. 2, M is a factor (a magnification factor) indicating a magnification degree (or a magnification ratio) of an elemental image, where M=z/f. Here, z is the distance between a reconstruction location (the reconstruction image plane 50) and the virtual pinhole array 40 as shown in FIGS. 1A and 1B, and f is the distance between the elemental image 30 and the virtual pinhole array 40 and refers to the focal length of the virtual pinhole.

The magnified elemental images overlap each other, and the overlapping numbers of elemental images corresponding to pixel locations of a reconstruction image plane are normalized so that a reconstructed image is completed.

In the existing method, overlapping of magnified elemental images produces a blurring effect in a reconstructed image, an effect that processes a 3D object present at a specific location to be clear and other 3D objects to be unclear.

Since the number of overlaps of an elemental image is associated with the magnification factor, which is a fixed parameter increasing in proportion to a reconstruction length, the intensity of the blurring effect also increases in proportion to the reconstruction distance.

As for an elemental image obtained in a perfect acquisition process, a perfect 3D image may be reconstructed based on the blurring effect. Conversely, when an elemental image has physical defects involved with lighting or lenslet array the blurring effect is not perfect, thereby causing the 3D image to be reconstructed with low visual quality. In such a model, the intensity of the blurring effect may not be adjustable, which causes a difficulty in improving the visual quality.

SUMMARY OF THE INVENTION

The present invention provides a method and apparatus for reconstructing a four-dimensional (4D) image based on integral imaging that allow the intensity of the blurring effect to be adjusted by freely adjusting the number of overlapping pixels (or the number of overlaps of an elemental image) in a computational integral imaging reconstruction (CIIR) process.

The present invention provides a method and apparatus for reconstructing a 4D image based on integral imaging that allow a 4D image or a multiple volume/multiple image plane to be reconstructed by performing CIIR on an Elemental Image Array (EIA) on the basis of a new parameter (an adjustable magnification factor (k)) that enables free adjustment of the number of overlapping pixels (or the number of overlaps of an elemental image).

The technical objectives of the present invention are not limited to the above, and other objectives may become apparent to those of ordinary skill in the art based on the following description.

According to the first aspect of the present invention, there is provided a method of reconstructing a four-dimensional (4D) image based on integral imaging, the method including determining a crop ratio of an original elemental image array (EIA), cropping each elemental image in the original EIA according to the determined crop ratio to generate a cropped and translated EIA, magnifying each elemental image in the cropped and translated EIA according to an adjustable magnification factor (k), overlapping the magnified elemental images with an overlapping number that is adjusted according to the adjustable magnification factor (k), and normalizing the overlapping elemental images to generate a reconstructed image.

According to the second aspect of the present invention, there is provided an apparatus for reconstructing a 4D image based on integral imaging, the apparatus including a crop ratio determination unit configured to determine a crop ratio of an original elemental image array (EIA), a transformation unit configured to crop the original EIA according to the determined crop ratio to transform the original EIA into a cropped and translated EIA, a magnification unit configured to magnify each elemental image in the cropped and translated EIA with an adjustable magnification factor (k), an overlapping unit configured to overlap the magnified elemental images with an overlapping number that is adjusted according to the adjustable magnification factor (k), and a normalization unit configured to normalize the overlapping elemental images to generate a reconstructed image.

According to the third aspect of the present invention, there is provided a method of reconstructing a 4D image based on integral imaging, the method including calculating a crop ratio of an original elemental image array (EIA) based on a magnification factor (k) that is designated by a user and a reconstruction location (z) indicating a distance between a virtual pinhole and a reconstruction image plane on which a reconstructed image is reconstructed, cropping the original EIA according to the calculated crop ratio and translating the cropped EIA to generate a cropped and translated EIA, magnifying each elemental image in the cropped and translated EIA with the magnification factor (k), and overlapping the magnified elemental images with an overlapping number and normalizing the overlapping elemental images to generate a reconstructed image.

DETAILED DESCRIPTION OF EXEMPLARY EMBODIMENTS

Hereinafter, aspects for implementing the present invention will be described with reference to the following embodiments. The present invention is not limited to such embodiments, and the present invention may be embodied in various forms within the scope of the technical spirit of the present invention. The terminology used herein is for the purpose of describing particular embodiments only and is not intended to be limiting to the invention. As used herein, the singular forms "a," "an," and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components but do not preclude the presence or addition of one or more other features, integers, steps, operations, elements, components, and/or groups thereof.

The present invention proposes a computational integral imaging reconstruction (CIIR) method for reconstructing a 4D image or multiple volume. That is, the CIIR proposed by the present invention reconstructs a 3D or multiple image plane at the same location.

Figure 3:
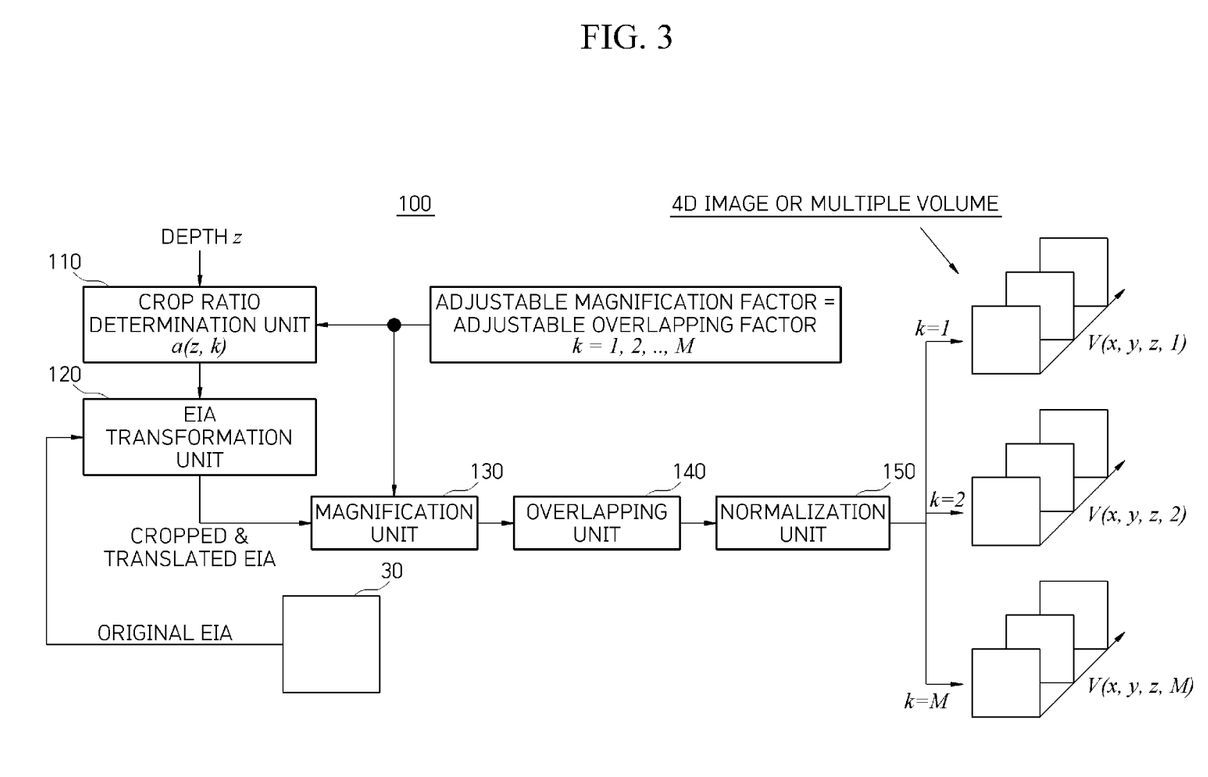
FIG. 3 is a block diagram illustrating an apparatus for reconstructing a 4D image based on integral imaging according to an embodiment of the present invention.
Figure 4:
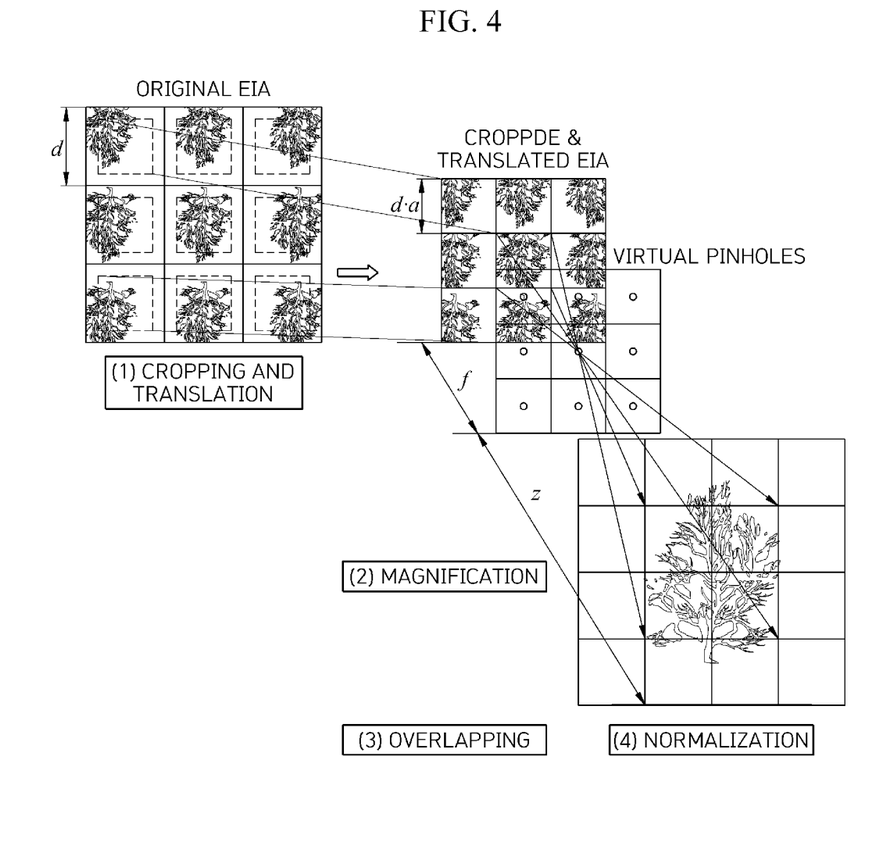
FIG. 4 is a schematic diagram illustrating a CIIR method performed by an apparatus for reconstructing a 4D image based on integral imaging according to an embodiment of the present invention.

FIG. 3 is a block diagram illustrating an apparatus for reconstructing a 4D image based on integral imaging according to an embodiment of the present invention, and FIG. 4 is a schematic diagram illustrating a CIIR method performed by an apparatus for reconstructing a 4D image based on integral imaging according to an embodiment of the present invention.

First, referring to FIG. 3, an apparatus 100 for reconstructing a 4D image based on integral imaging according to the embodiment of the present invention includes a crop ratio determination unit 110, an elemental image array (EIA) transformation unit 120, a magnification unit 130, an overlapping unit 140, and a normalization unit 150.

Crop Ratio Determination Unit 110

The crop ratio determination unit 110 performs a process of determining a crop ratio $\alpha(z, k)$. Specifically, the crop ratio determination unit 110 calculates the crop ratio using a depth z and an adjustable magnification factor determined by k=1, 2, . . . , and M, which is capable of adjusting the number of overlapping pixels (or the number of overlaps of an elemental image) as input parameters. Here, the depth z refers to a reconstruction location (or the distance between a virtual pinhole array 40 (see FIG. 1A) and a reconstruction image plane 50 (see FIG. 1B).

The main difference between the existing CIIR and the CIIR proposed by the present invention is that an EIA is transformed through a cropping process and a translation process. In order to crop each elemental image in the EIA, the crop ratio needs to be determined. To this end, the crop ratio determination unit 110 compares EIAs before and after transformation according to a cropping process and a translation process and calculates the crop ratio in a direction in which actual physical location information does not change. The calculation of the crop ratio will be described in detail below.

In addition, another main difference between the existing CIIR and the CIIR proposed by the present invention is that not only a reconstruction location (a depth z) of an object but also a parameter (an adjustable magnification factor, k=1, 2, . . . , and M) capable of adjusting the number of overlapping pixels at the reconstruction location are introduced as input parameters so that a two dimensional (2D) input parameter is designed. In this manner, for each 2D parameter, one 2D reconstruction image is obtained, which results in constructing a 4-D image.

EIA Transformation Unit 120

The EIA transformation unit 120 performs a process of transforming an original EIA into a new EIA (a cropped and translated EIA). Specifically, the EIA transformation unit 120 crops the original EIA according to the crop ratio α(z, k) determined by the crop ratio determination unit 110 and then translates the cropped EIM so that the cropped and translated EIA is generated as a new EIA.

In order to help understand the generation of such a new EIA, a description thereof will be made with reference to the accompanying drawings. As shown in FIG. 4, assuming that one elemental image in the original EIA has a size of d, and the crop ratio for an elemental image having a size of d is α (0<α≤1), the EIA transformation unit 120 crops the elemental images having a size of d by the crop ratio of α and translates each cropped element image to generate a new EIA (a cropped and translated EIA).

Magnification Unit 130

The magnification unit 130 performs a process of magnifying each element image in the new EIA (the cropped and translated EIA) according to an adjustable magnification factor k with respect to the new EIA (the cropped and translated EIA) that is transformed from the original EIA by the EIA transformation unit 120.

The adjustable magnification factor k may be replaced by the term "magnification power," and the adjustable magnification factor k is used in the same meaning as "an adjustable number of overlapping pixels" or "an adjustable number of overlaps of an element image (an adjustable overlapping number)."

Overlapping Part 140

The overlapping unit 140 performs a process of overlapping magnified element images in a new EIA (the cropped and translated EIA) magnified by the magnification unit 130. In this case, the magnified elemental images overlap each other according to the adjustable overlapping number that is determined by the adjustable magnification factor k.

Normalization Unit (150)

The normalization unit 150 normalizes corresponding overlapping numbers of magnified elemental images at respective pixel locations of a reconstructed image lane to generate a reconstructed image.

In this case, the overlapping numbers of the magnified elemental images may be adjusted by the adjustable magnification factor k and may be a free parameter as determined by k=1, 2, . . . , and M. That is, for k=1, a plurality of 2D images of V(x, y) according to the depth z are reconstructed, and for k=2, a plurality of 2D images of V(x, y) according to the depth z are reconstructed, and for k=M, a plurality of 2D images of V(x, y) according to the depth z are reconstructed.

As such, it can be seen that an input parameter newly introduced according to the present invention, that is, an adjustable magnification factor k, is considered a new axis of k that is added to the x, y, and z axes so that a 4D image of V(x, y, z, k) is reconstructed from an original EIA.

Hereinafter, a principle of adjusting a magnification factor for cropped elemental images and a method of obtaining a crop ratio from the principle will be described in detail with reference to FIGS. 5A, 5B and 5C.

Figure 5A:
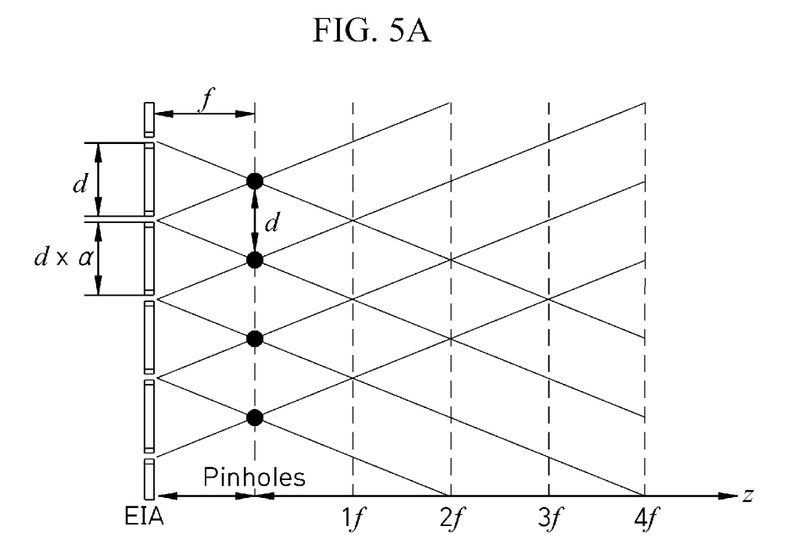
FIGS. 5A, 5B and 5C are views for describing a principle of adjusting a magnification factor for cropped elemental images according to an embodiment of the present invention.
Figure 5B:
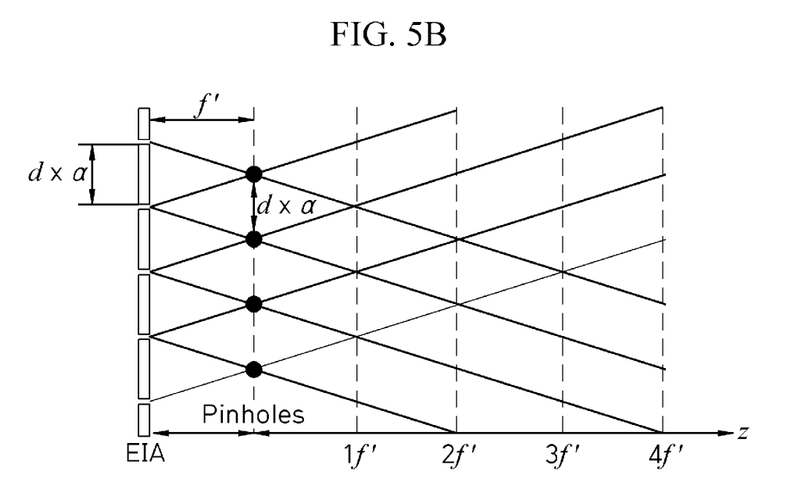
Figure 5C:
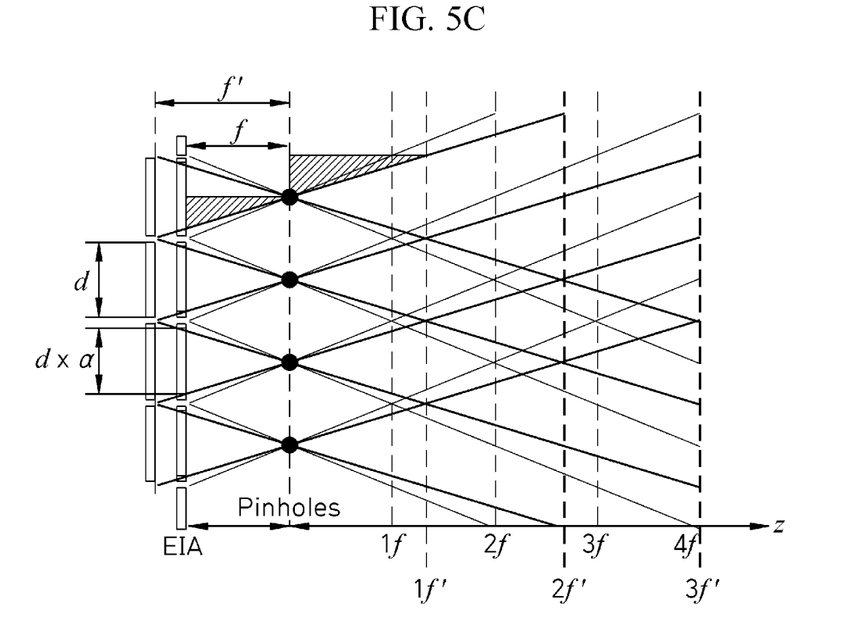

FIGS. 5A, 5B and 5C are views for describing a principle of adjusting a magnification factor for cropped elemental images according to an embodiment of the present invention.

In FIG. 5A, it can be seen that all elemental images in an input original EIA are cropped by a into cropped elemental images having a size of dα. The cropped elemental images are translated one after another to form a new EIA (a cropped and translated EIA) as shown in FIG. 5B.

CIIR performed using the new generated EIA (the cropped and translated EIA) obtains a 3D image that is different from a result obtained by performing CIIR using elemental images in the original EIA due to a change in the size of the elemental image. That is, when an elemental image is cropped, the actual original physical location is lost.

In order to compensate for this, deriving a relationship between a change due to crop and an actual physical reconstruction location z is required.

To this end, two EIAs are superimposed as shown in FIG. 5C.

Since the cropped and translated EIA is smaller than the original EIA, the cropped and translated EIA, that is, the transformed EIA, is stretched to match pinholes of the two EIAs (FIGS. 5A and 5B).

When the pinholes are matched, the original physical location reconstructed by CIIR may be identified so that the location relatively reconstructed by the crop ratio may be accurately calculated. Therefore, the crop ratios and new focuses may be calculated by Equation 1 below through FIG. 5C.

$$f' = \frac{f}{\alpha} \qquad \text{[Equation 1]}$$

In the present model, the transformed EIA is caused to have a new focal length f' which is longer than the existing focal length f. When an elemental image having a size of d in an EIA before transformation is magnified by M through a pinhole array having a focal length of f and back-projected, the reconstruction location is determined as z=1f, 2f, . . . , and Mf. When a cropped element image having a size of dα after transformation is magnified by M and back-projected, the reconstruction location is determined as z=1f', 2f', . . . , and kf'. In this case, k is a new magnification factor (a magnification power).

The reconstruction location is calculated as z=kf' using the new focal length and the new magnification factor k (a magnification power), and the reconstruction location is determined as z=Mf using the existing focal length and the existing magnification power information. In this case, in order to physically secure the same reconstruction location for the two EIAs before and after transformation, the depth needs to satisfy z=kf'=Mf. When the relationship is summarized with Equation 1 above, the crop ratio may be calculated through Equation 2 below.

$$\alpha(z, k) = \frac{f}{f'} = \frac{k}{M} = \frac{kf}{z} \quad \text{[Equation 2]}$$

Here, k is an integer satisfying 1≤k≤floor (M), k and z are independent from each other, and the focal length f is a fixed value. Equation 2 indicates that the crop ratio is adjustable to control the magnification factor k.

Here, k is an integer satisfying 1≤k≤floor(M). It can be seen that, from the equation, the crop ratio required to obtain a new EIA is obtainable from the reconstruction location z and the magnification factor k (or the number of overlaps of elemental images). Here, f is a focal length of an EIA of a lenslet array at a time of acquisition, that is, a fixed value. On the other hand, the parameter k is a free parameter. That is, k may be any number that is adjustable. The parameter k is considered as a k-axis added to the x, y, and z axes to reconstruct a 4D image.

As described above, the number of overlapping pixels (the number of overlaps of elemental images) may be adjusted by the adjustable magnification factor k that is newly introduced as an input parameter, and the number of overlapping pixels is a parameter having a significant influence on the quality of the reconstructed image and may be considered as an important parameter in 3D applications.

As described above, the present invention newly adopts a parameter (the adjustable magnification factor k) that does not exist in the conventional CIIR method so that the new parameter (the adjustable magnification factor k) is additionally used as a k-axis added to the x, y, and z axes at all q restoration reconstruction depths z to reconstruct a 4D image of V (x, y, z, k).

In addition, since CIIR is performed based on the new parameter (the adjustable magnification factor k) capable of freely adjusting the number of overlapping pixels (or the number of overlaps of elemental images), the intensity of the blurring effect may be adjusted, whereby the visual quality of the reconstructed image may be improved.

Figure 6:
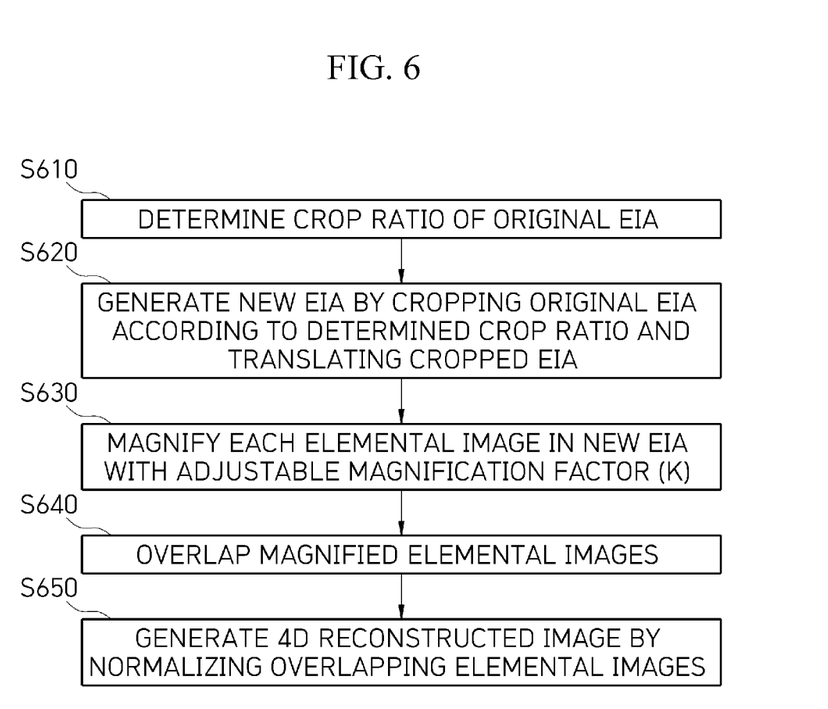
FIG. 6 is a flowchart showing a method of reconstructing a 4D image based on integral imaging according to an embodiment of the present invention.

FIG. 6 is a flowchart showing a method of reconstructing a 4D image based on integral imaging according to an embodiment of the present invention.

Referring to FIG. 6, first, in operation S610, a process of determining a crop ratio of an original EIA (hereinafter, referred to as "a first EIA") is performed.

According to an example, the crop ratio is determined by comparing EIAs before and after transformation, i.e., the first EIA and a new EIA generated by transformation of the first EIA (hereinafter, referred to as "a second EIA") and determining the crop ratio in a direction in which actual physical location information does not change. That is, the crop ratio is determined so that the reconstruction location z of the first EIA and the reconstruction location z of the second EIA are the same. In this case, the reconstruction location z represents a distance (depth) between virtual pinholes and a reconstruction image plane onto which a reconstructed image is back-projected.

According to another example, the crop ratio is determined according to the reconstruction location z of the reconstructed image and the adjustable magnification factor k. The determination of the crop ratio has been sufficiently described in Equation 2 above, and thus descriptions thereof will be omitted.

Subsequently, in operation S620, a process of generating the second EIA (the new EIA) by cropping the first EIA (the original EIA) according to the determined crop ratio is performed. For example, each elemental image in the first EIA is cropped according to the determined crop ratio and is translated so that the second EIA (a cropped and translated EIA) is generated.

Subsequently, in operation S630, a process of magnifying each elemental image in the second EIA (the new EIA) with the adjustable magnification factor k used to calculate the crop ratio is performed. In this case, the adjustable magnification factor k is configured to include a plurality of unfixed integers (k=1, 2, ..., and M).

Subsequently, in operation S640, a process of overlapping the magnified elemental images is performed. In this case, the magnified elemental images overlap each other with the overlapping number equal to the adjustable magnification factor k.

Subsequently, in operation S650, a process of normalizing the overlapping elemental images to generate a reconstructed image is performed. In this case, the reconstructed image is reconstructed on a 4D coordinate system having the x, y, and z axes and an additional k axis corresponding to the adjustable magnification factor k so that the reconstructed image is a 4D image (a multiple volume or multiple image plane).

As described above, the method of reconstructing a 4D image according to the present invention includes four processes of cropping, magnification, overlapping, and normalization.

The main difference between the existing method and the method of reconstructing a 4D image according to the present invention is the introduction of a new parameter denoted by k. The parameter is equivalent to controlling the crop ratio in the elemental image based on magnification information that is designated by a user.

The conventional image reconstruction method is a technique for reconstructing a 3D image and has magnification information depending on the depth of each reconstruction plane. Therefore, a user cannot designate the magnification information (a magnification factor).

The magnification information (the magnification factor) is theoretically equal to the number of overlapping elemental images. Therefore, when the magnification information (magnification factor) is adjustable, the degree to which the elemental images overlap may be adjustable. This is an important factor in the quality of the reconstructed image. Magnification information (magnification factor) independent of depth z is considered a k-axis and used together with 3D location information (location information in a 3D coordinate system consisting of x, y, and z axes) to represent a 4D image of V (x, y, z, k).

Accordingly, the method of reconstructing an image based on integral imaging according to the present invention may reduce blurring of a focused object by controlling the number of overlapping elemental images.

In addition, the method of reconstructing an image based on integral imaging according to the present invention may provide a 4D image to thereby provide an acquired image with visual information improved by one step more than the conventional approach.

Meanwhile, the apparatus and method for reconstructing an image based on integral imaging according to the present invention may be implemented in a computer system or may be recorded on a recording medium. The computer system may include at least one processor, a memory, a user input device, a data communication bus, a user output device, and a storage. The above described components perform data communication through the data communication bus.

Regarding the processor, the components 110, 120, 130, 140, and 150 shown in FIG. 3 may be implemented as separate functional logics and mounted in one processor or may be implemented as separate processors.

The computer system may further include a network interface coupled to a network. The processor may be a central processing unit (CPU) or a semiconductor device for processing instructions stored in the memory and/or storage.

The memory and the storage may include various forms of volatile or nonvolatile media. For example, the memory may include a read only memory (ROM) or a random-access memory (RAM).

In addition, the method of reconstructing an image based on integral imaging according to the present invention may be implemented in a method executable by a computer.

The method of reconstructing an image based on integral imaging according to the present invention may be embodied as computer readable codes on a computer-readable recording medium. The computer-readable recording medium is any recording medium that can store data that can be read thereafter by a computer system. Examples of the computer-readable recording medium include a ROM, a RAM, a magnetic tape, a magnetic disk, a flash memory, an optical data storage, and the like. In addition, the computer-readable recording medium may be distributed over network-connected computer systems so that computer readable codes may be stored and executed in a distributed manner.

As is apparent from the above, the intensity of the blurring effect can be adjusted by performing CIIR on an EIA on the basis of a new parameter (an adjustable magnification factor k) that enables free adjustment of the number of overlapping pixels (or the number of overlaps of an elemental image) in a CIIR method so that the reconstructed image is provided with an improved visual quality.

In addition, since the new parameter (the adjustable magnification factor k) is used as an input parameter, a 4D image of V(x, y, z, k) having the new parameter as a k-axis can be reproduced.

Although the present invention has been described with reference to the embodiments, a person of ordinary skill in the art should appreciate that various modifications, equivalents, and other embodiments are possible without departing from the scope and sprit of the present invention. Therefore, the embodiments disclosed above should be construed as being illustrative rather than limiting the present invention. The scope of the present invention is not defined by the above embodiments but by the appended claims of the present invention, and the present invention is to cover all modifications, equivalents, and alternatives falling within the spirit and scope of the present invention.

What is claimed is:

1. A method of reconstructing an integral image based on computational integral imaging reconstruction (CIIR), the method comprising:
   determining a crop ratio of an original elemental image array (EIA) including elemental images, based on a reconstruction location of a reconstructed image of the elemental images, and an adjustable magnification factor indicating a number of overlapping images at the reconstruction location, among the elemental images;
   cropping each elemental image in the original EIA according to the determined crop ratio to generate a cropped and translated EIA;
   magnifying each of the elemental images in the cropped and translated EIA according to the adjustable magnification factor;
   overlapping the magnified elemental images with an overlapping number that is adjusted according to the adjustable magnification factor (k); and
   normalizing the overlapping elemental images to generate the reconstructed image.

2. The method of claim 1, wherein the determining of the crop ratio includes determining the crop ratio so that the reconstruction location (z) of the original EIA is identical to the reconstruction location of the cropped and translated EIA,
   wherein the reconstruction location represents a depth between a virtual pinhole and a reconstruction image plane onto which the reconstructed image is back projected.

3. The method of claim 1, wherein k is the adjustable magnification factor that varies among a set of integers, and M is a largest integer among the set of integers, and
   wherein the crop ratio corresponds to k divided by M.

4. The method of claim 1, wherein the generating of the cropped and translated EIA includes:
   cropping each of the elemental images in the original EIA with the determined crop ratio; and
   translating the cropped elemental images to generate the cropped and translated EIA.

5. The method of claim 1, wherein the overlapping includes overlapping the magnified elemental images with the overlapping number identical to the adjustable magnification factor.

6. The method of claim 1, wherein, in the generating of the reconstructed image, the reconstructed image is a four-dimensional (4D) image reconstructed on a 4D coordinate system having x, y, and z axes and an additional k axis corresponding to the adjustable magnification factor.

7. The method of claim 1, wherein the adjustable magnification factor includes a plurality of integers that are not fixed.

8. An apparatus for reconstructing an integral image based on computational integral imaging reconstruction (CIIR), the apparatus comprising at least one processor configured to:
   a crop ratio of an original elemental image array (EIA) including elemental images, based on a reconstruction location of a reconstructed image of the elemental images, and an adjustable magnification factor indicating a number of overlapping images at the reconstruction location, among the elemental images;
   crop the original EIA according to the determined crop ratio to transform the original EIA into a cropped and translated EIA;
   magnify each of the elemental images in the cropped and translated EIA with the adjustable magnification factor (k);
   overlap the magnified elemental images with an overlapping number that is adjusted according to the adjustable magnification factor (k); and
   normalize the overlapping elemental images to generate the reconstructed image.

9. The apparatus of claim 8, wherein the at least one processor is further configured to determine the crop ratio so that the reconstruction location of the original EIA is identical to the reconstruction location of the cropped and translated EIA,
   wherein the reconstruction location represents a depth between a virtual pinhole and a reconstruction image plane onto which the reconstructed image is back projected.

10. The apparatus of claim 8, wherein k is the adjustable magnification factor that varies among a set of integers, and M is a largest integer among the set of integers, and wherein the crop ratio corresponds to k divided by M.

11. The apparatus of claim 8, wherein the at least one processor is further configured to crop each of the elemental images in the original EIA with the determined crop ratio and translate the cropped elemental images to generate the cropped and translated EIA.

12. The apparatus of claim 8, wherein the at least one processor is further configured to overlap the magnified elemental images with the overlapping number identical to the adjustable magnification factor.

13. The apparatus of claim 8, wherein the at least one processor is further configured to generate a four-dimensional (4D) image reconstructed on a 4D coordinate system obtained by adding a k axis corresponding to the magnification factor to a three-dimensional (3D) coordinate system having x, y, and z axes as the reconstructed image.

14. A method of reconstructing an integral image based on computational integral imaging reconstruction (CIIR), the method comprising:

calculating a crop ratio of an original elemental image array (EIA) including elemental images, based on a magnification factor that is designated by a user and that indicates a number of overlapping images at a reconstruction location of the elemental images, among the elemental images, and the reconstruction location indicating a depth between a virtual pinhole and a reconstruction image plane on which a reconstructed image is reconstructed;

cropping the original EIA according to the calculated crop ratio and translating the cropped EIA to generate a cropped and translated EIA;

magnifying each elemental image in the cropped and translated EIA with the magnification factor; and overlapping the magnified elemental images with an overlapping number and normalizing the overlapping elemental images to generate the reconstructed image.

15. The method of claim 14, wherein the overlapping number is identical to the adjustable magnification factor (k) that is designated by the user.

16. The method of claim 14, wherein, in the generating of the reconstructed image, the reconstructed image is a multiple volume or multiple image plane reconstructed on a 4D coordinate system obtained by adding an k axis corresponding to the adjustable magnification factor to a three-dimensional (3D) coordinate system having x, y, and z axes according to the reconstruction location and the adjustable magnification factor (k) that are variable.

* * * * *